(12) United States Patent
Tanner et al.

(10) Patent No.: US 10,681,905 B2
(45) Date of Patent: Jun. 16, 2020

(54) ROBOT VEHICLE AND METHOD USING A ROBOT FOR AN AUTOMATIC TREATMENT OF VEGETABLE ORGANISMS

(71) Applicant: Ecorobotix SA, Yverdon-les-Bains (CH)

(72) Inventors: Steve Tanner, Essert-Pittet (CH); Aurélien Demaurex, Crissier (CH); Gabriele Mondada, Yverdon (CH)

(73) Assignee: Ecorobotix SA, Yverdon-les-Bains (CH)

( * ) Notice: Subject to any disclaimer, the term of this patent is extended or adjusted under 35 U.S.C. 154(b) by 0 days.

(21) Appl. No.: 15/737,145

(22) PCT Filed: Jul. 1, 2016

(86) PCT No.: PCT/IB2016/053983
§ 371 (c)(1),
(2) Date: Dec. 15, 2017

(87) PCT Pub. No.: WO2017/002093
PCT Pub. Date: Jan. 5, 2017

(65) Prior Publication Data
US 2018/0168141 A1 Jun. 21, 2018

(30) Foreign Application Priority Data
Jul. 2, 2015 (CH) ...................................... 0959/15

(51) Int. Cl.
*A01M 21/02* (2006.01)
*A01G 3/06* (2006.01)
(Continued)

(52) U.S. Cl.
CPC ............. *A01M 21/02* (2013.01); *A01G 3/062* (2013.01); *A01M 21/043* (2013.01);
(Continued)

(58) Field of Classification Search
None
See application file for complete search history.

(56) References Cited

U.S. PATENT DOCUMENTS 550,711 A 12/1895 Eads
5,606,821 A 3/1997 Sadjadi et al.
(Continued)

FOREIGN PATENT DOCUMENTS

WO WO-2009/153304 A1 12/2009
WO WO-2012/094116 A1 7/2012

OTHER PUBLICATIONS

International Search Report and Written Opinion for PCT/IB2016/053983, dated Sep. 9, 2016, 6 pages.
(Continued)

*Primary Examiner* — Leon Viet Q Nguyen
(74) *Attorney, Agent, or Firm* — Blank Rome LLP

(57) ABSTRACT

The invention concerns a method using a robot for an automatic treatment of a weed, the method comprises steps of capturing images of said weed with a camera on said robot; determining with said images a distance between the weed and a second vegetable organism; and selecting a treatment tool of said robot for a treatment of the weed from a group of treatment tools as function of said distance.
The invention further concerns a robotic vehicle for carrying out the method for an automatic treatment of a weed.

20 Claims, 4 Drawing Sheets

(51) Int. Cl.
*A01M 21/04* (2006.01)
*B25J 9/16* (2006.01)
*G06K 9/00* (2006.01)
*A01G 7/00* (2006.01)

(52) U.S. Cl.
CPC ........... *B25J 9/1679* (2013.01); *B25J 9/1694* (2013.01); *G06K 9/00671* (2013.01); *A01G 7/00* (2013.01)

(56) References Cited

U.S. PATENT DOCUMENTS

| | | | |
|---|---|---|---|
| 6,595,298 B1 * | 7/2003 | Crady | A01B 1/065 172/111 |
| 6,795,568 B1 | 9/2004 | Christensen et al. | |
| 2013/0235183 A1 * | 9/2013 | Redden | G06K 9/2036 348/89 |
| 2015/0027040 A1 | 1/2015 | Redden | |
| 2015/0070188 A1 * | 3/2015 | Aramburu | A01G 25/167 340/870.02 |
| 2015/0245565 A1 * | 9/2015 | Pilgrim | A01G 7/06 280/79.2 |
| 2017/0359943 A1 * | 12/2017 | Calleija | B64D 1/18 |

OTHER PUBLICATIONS

D.C. Slaughter et al., "Autonomous Robotic Weed Control Systems: A review", Computers and Electronics in Agriculture, www.elsevier.com/locate/compag; vol. 61, 2008, pp. 63-78.

"Seed Night", EPFL Alumni, Forum Rolex Learning Center, https://www.youtube.com/watch?v=tiyLSOCwX5c; Apr. 22, 2015.

* cited by examiner

ROBOT VEHICLE AND METHOD USING A ROBOT FOR AN AUTOMATIC TREATMENT OF VEGETABLE ORGANISMS

RELATED APPLICATIONS

This application is a national phase of PCT/IB2016/053983, tiled on Jul. 1, 2016 which claims priority to Switzerland Patent Application No. 00959/15, filed on Jul. 2, 2015. The contents of the applications are hereby incorporated by reference.

FIELD OF THE INVENTION

The present invention concerns a method using a robot vehicle for an automatic treatment of a vegetable organism, in particular an elimination or killing of a weed.

The present invention further concerns a robotic vehicle and an arrangement for an automatic treatment of a vegetable organism.

DESCRIPTION OF RELATED ART

Nowadays, developed agriculture relies on heavy equipment performing mechanized tasks in order to minimize costs and maximize efficiency.

The problem of weeding is particularly significant. Currently, heavy tractors are commonly used to dispense herbicide on all the plants within a cultivated field, as this is a fast method to kill weeds. The entire surface of the cultivated field is thus sprayed, without distinction about whether there are weeds to destroy or not. This dispensing method has several drawbacks. First, it represents an economical loss, as only a fraction of the herbicide is really used. Second, this has adverse consequences on the environment and human health because the toxic herbicides, spread in larger quantities than needed, terminate on the ground or on the cultivated plants. Finally, this technique requires selective herbicides that destroy weeds while leaving cultivated plants unharmed as well as to develop crops resistant to such herbicides.

There is thus a need for a more efficient and cost-effective automatic treatment of vegetable organism, in particular for the treatment of cultivated plants and of weeds.

U.S. Pat. No. 550,711 discloses a selective spraying system for controlling the growth of weeds that comprises means for detecting weeds.

U.S. Pat. No. 5,606,821 discloses a weeds recognition system that permits an application of selective herbicides.

U.S. Pat. No. 6,795,568 discloses a method and an apparatus arranged to detect weed that are then severed by an electromagnetic irradiating tool. The emitting position, the intensity and the direction of the electromagnetic irradiations are determinates on a case-by-case basis in order to minimize damage on cultivate plants.

US2015027040 discloses a method for a treatment of cultivated plants comprising an automatic selection of the treatment to be applied, depending on meteorological conditions as well as on already planned treatments.

BRIEF SUMMARY OF THE INVENTION

An aim of the invention is to provide a system and a method providing an automatic treatment of a vegetable organism that is more efficient, more environmental-friendly and/or more cost-effective with respect to prior art.

According to the invention, these aims are achieved by means of the method using a robot for an automatic treatment of a vegetable organism of claim 1, the robot vehicle of claim 13 and the arrangement of claim 18.

An advantage of the robot vehicle and of the method is to provide a more efficient and cost-effective treatment by selecting the most appropriate treatment tool for treating each vegetable organism without harming surrounding vegetable organisms.

The method comprises the treatment of either the cultivated plant as first vegetable organism, or of a weed as first vegetable organism. In both embodiments, the treatment is selected on a plant-by-plant basis among a physical treatment or chemical treatment.

In the case of treatment of a cultivated plant, the method comprises a selection between a physical tool and a spraying tool for treating the cultivated plant as first vegetable organism.

In the case of weed treatment, the method comprises a selection between a physical tool and an herbicide for eliminating the weed as first vegetable organism.

In one embodiment, a physical tool is selected when the distance between a plant to treat and a second plant of a different type is higher than a first threshold. It is thus possible to avoid the risk of harming the second plant with the physical tool.

The physical tool can be a mechanical cutting or uprooting tool, an optical tool emitting electromagnetically radiations, an electrical tool emitting electric discharge or a heat radiant tool. The physical tool can also be a trimming tool.

In one embodiment, an herbicide is selected when the distance between a plant to treat and a second plant of a different type is lower than a first threshold, in particular a selective herbicide.

A non-selective herbicide could be used when the distance between a plant to treat and a second plant of a different type is higher than a second threshold.

The selection among the type of tools may also depend on other parameters than just the distance between a plant to treat and a second plant of a different type.

The selection among the type of tools may also depend on parameters measured by one or a plurality of physical sensors on the robot, such as temperature, illumination, moisture rate, time, date or humidity sensor.

The selection among the type of tools may also depend on parameters received from a remote system, such as weather forecasts.

In a preferred embodiment, the physical tool is selected instead of a chemical tool each time the mechanical tool is expected to be efficient and to leave other cultivated plants unharmed. This would lead to a reduced use of chemicals.

The robot vehicle can perform an automatic treatment of the culture. In the sense of the invention, an automatic treatment is any treatment executed substantially without human aid.

According to an independent aspect, the invention also relates to a method for an automatic navigation of a robot vehicle for a treatment of a vegetable organism using a rough estimate of the position of the vehicle with a satellite navigational system, and a more precise estimate using computer vision and detection of the displacement of features of the image between successive frames.

BRIEF DESCRIPTION OF THE DRAWINGS

The invention will be better understood with the aid of the description of an embodiment given by way of example and illustrated by the figures, in which.

DETAILED DESCRIPTION OF POSSIBLE EMBODIMENTS OF THE INVENTION

Figure 1:
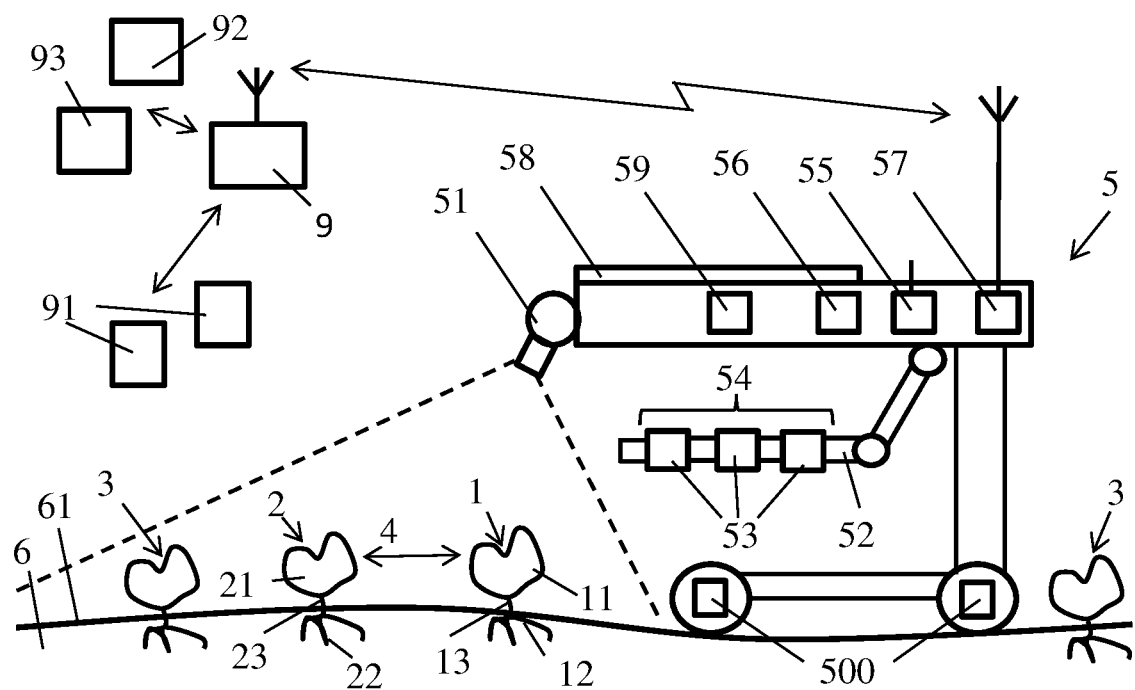
FIG. 1 shows a view of a robot vehicle, according to the invention.

FIG. 1 shows an embodiment of a robot vehicle 5. The robot vehicle can move on a surface 61 of a cultivated field 6 for applying a treatment.

The robot vehicle may comprise a structure with a horizontal platform supporting photovoltaic cells 58, a battery as electrical power supply 59 loaded by the photovoltaic cell, at least one driving motor 500 powered by the battery, and a number of wheels driven in rotation by the motor or motors. An articulated arm 52, for example a robotic arm or a delta robotic arm, is mounted on the structure under the platform. A camera 51 is mounted on the structure for capturing images of the ground in front of the robot, or under the robot, in order to recognize plants to be treated from other plants, and to navigate. The camera can be a combination of any imaging apparatus working at different wavelengths (visible, infrared), with or without spectral filters (hyperspectral camera) and with or without 3D capability (stereo vision, time of flight, etc.). The selection among the type of tools may also depend on parameters measured by one or a plurality of physical sensors on the robot, such as temperature, moisture rate, illumination, time, date or humidity sensor. One or a plurality of tanks are mounted under the platform, for dispensing fluid treatment of spraying nozzles, as will be seen. The robot vehicle is controlled by a processing system on the platform. The processing system may comprise a wireless interface for communication with a remote control system, and a navigational system 55 providing rough estimates of the position of the robot vehicle 5, for example a GPS, Galileo or Glonass satellite positioning system.

The cultivated field 6 comprises a plurality of vegetables organisms 1, 2, 3, notably first vegetable organisms 1 and second vegetable organisms 2.

The first vegetable organisms can be for example a cultivated plant, in particular, a sugar beet, a potato, a sunflower, a sweetcorn (or maize), or a market gardener (or truck farmer). In this case, the treatment applied to the first vegetable could include for example dispensing a fertilizer, cropping, or any mechanical or chemical treatment useful to the development of the cultivated plant.

Alternatively, the first vegetable organism can be a weed. In this case, the treatment could include any physical (for example mechanical) or chemical treatment for removing or killing the weed.

Weeds are unwanted vegetable organisms, e.g. vegetable organisms challenging the cultivated organisms or an uncultivated vegetable organism and that need to be removed.

The invention is particularly adapted to plants cultivated in aligned rows, although they can also be freely disposed on a field area.

The robot vehicle 5 comprises a tools supporting system destined to support and drive a group 54 of treatment tools 53. The tools supporting system comprises an articulated arm 52, e.g. a robotic arm or a delta robotic arm, for moving the tools 53, or at least their operational extremities, to successive operational positions in order to treat the first vegetable organism 1.

In a preferred embodiment, the tools supporting system is controlled by the processing means so as to maintain during the treatment a fixed relative positioning of the selected tool 53, notably of the operational parts of the selected tool 53, with respect to the first vegetable organism 1, even when the robot vehicle 5 is in relative movement with respect to the first vegetable organism 1.

In an embodiment, the tools supporting system comprises at least one second articulated arm (e.g. a robotic arm or a delta robotic arm) destined for moving at least a treatment tool 53, or at least his operational extremities, to successive operational positions in order to treat the vegetable organism 1.

The tool or the tools supported by the second articulated arm can differ from the tools 53 of the first articulated arm 52 so to increase the variety of available tools and to perform complementary treatments. The tools supporting system is arranged to move the first and the second arms within parallel spatial areas in order to be able to treat the first vegetable organism 1 with each of the treatment tools of the first and second arm. For example, the first arm can be located and arranged to operate in front of the robot vehicle, while the second arm can be located and arranged to operate in the rear of the robot vehicle.

The group of treatment tools supported by the second articulated arms can be a replica of the group 54 of treatment tools 53 of the first arm. The tools supporting system is arranged to move the first and the additional arms within parallel and displaced spatial areas in order to parallelize the automatic treatment up, i.e. to treat substantially simultaneously a plurality of vegetable organism, permitting to speed up a treatment of dense culture fields.

In an embodiment, the tools supporting system is arranged to be removable, completely or at least partially, from the robot vehicle 5 in order to adapt the type of robot or the type of treatment tools 53 to different needs or treatments. A robot could be sold as a kit with a plurality of different interchangeable tools supporting systems.

In an embodiment, the tools supporting system allows an easy removal of each treatment tool 53 or of parts of each treatment tool 53 without replacing the complete tool supporting system.

The robot vehicle 5 comprises a camera 51 arranged to acquire images of a portion of the surface 61 of the ground 6 in front of or under the robot vehicle 5. A computer vision system 56 as part of the processing system processes the successive images captured with the camera and determine a distance 4 between each first vegetable organism 1 and the nearest second vegetable organism 2. The computer vision system 56 can identify the specie of the vegetable organism on the surface and map their position in the field, permitting an accurate treatment of the vegetable organism.

In a preferred embodiment, the second vegetable organism 2 is the closest vegetable organism within an image with respect to the vegetable organism to be treated (i.e. first vegetable organism 1).

The processing system of the robot vehicle 5 comprises a selecting module for selecting one of the treatment tools 53 as function of the distance 4 determined by the computer vision system 56, and possibly as function of other parameters.

The group of tools mounted on the robot comprises at least one physical tool and at least one chemical tool. The physical tool can comprise for example a mechanical tool for removing a weed. The chemical tool can comprise for example a first spraying tool for applying a phytosanitary product, a fertilizer or an herbicide to the first vegetable organism 1.

The group of tools may comprise additional tools, such as a second physical tool and/or a second spraying tool.

In an embodiment, the robot vehicle is arranged to provide a treatment to an unwanted first vegetable organism, i.e. a weed. In this embodiment, the treatment comprises eliminating the weed using either a physical tool or a spraying tool. The physical tool can be a mechanical cutting or uprooting tool, an optical tool emitting electromagnetically radiations, an electrical tool emitting electric discharge or a heat radiant tool. The spraying tool can apply a fluid product suitable to kill the unwanted vegetable, e.g. a pesticide, an herbicide, or a weed killer.

In another embodiment, the robot vehicle is arranged to provide a treatment to a cultivated plant. In this embodiment, the treatment comprises any treatment for helping the growth of the plant or the desirable part of the plant. The physical tool can be a mechanical tool for thinning or pruning parts of the plant. The spraying tool can apply a phytosanitary product or a fertilizer for example. The robot vehicle can comprises additional spraying tools dispersing different fluid products in order to enlarge the range of treatment that the robot vehicle can execute (e.g. phytosanitary treatments, fertilizing, etc.) in one passage.

Figure 2:
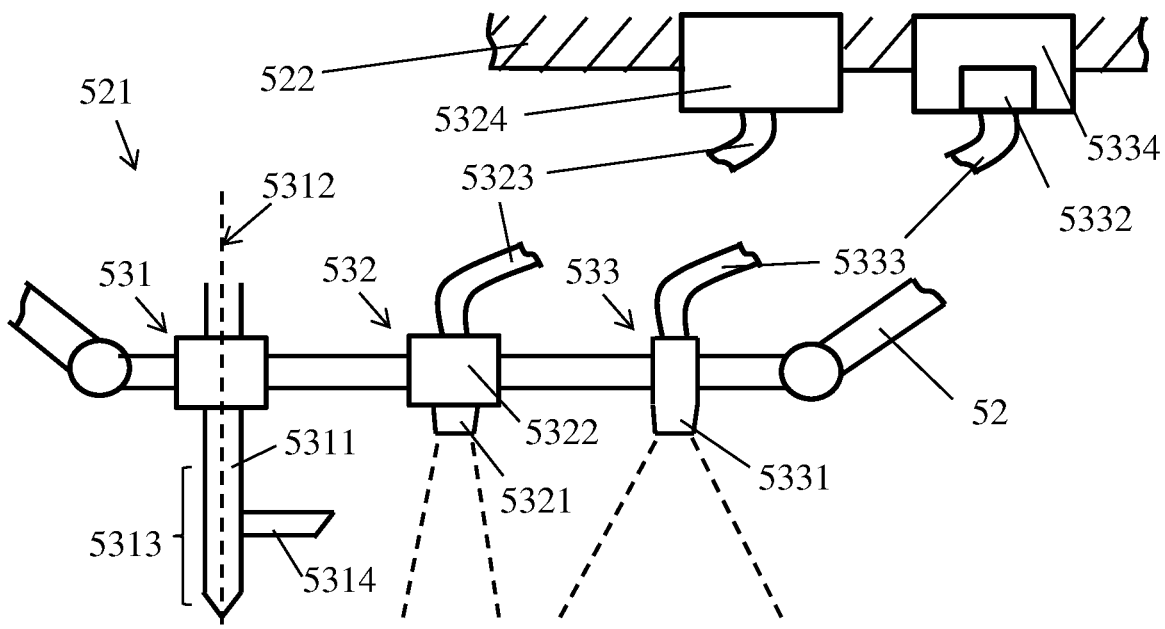
FIG. 2 is a detailed view of an articulated arm of the robot vehicle, according to the invention.

In the embodiment of FIG. 2, the robot vehicle comprises a mechanical tool 531, a first and a second spraying tool 532, 533. Each of the two spraying tools is connected to a different tank in order to apply a distinct fluid product. Advantageously, the articulated arm 52 is a delta robotic arm.

A distal extremity 521 of the articulated arm 52 of FIG. 2 supports the mechanical tool 531. The mechanical part comprises for example a motor (not shown) and a rod 5311 arranged to rotate about a rotational axis 5312 and having a terminal portion 5313 equipped with a blade 5314, The mechanical tool eliminate a weed by penetrating substantially vertically into the surface 61 of the ground 6 in order to cut the roots of the weed, The robot vehicle is thus arranged to move the distal extremity of the articulated arm 52 so that the horizontal relative speed of the rod 5311 with respect to the ground is substantially zero during the elimination of the first vegetable organism 1.

In a preferred embodiment, the terminal portion 5313 comprises a unique, radially extending blade 5314 with respect to said rotational axis 5312. Experiences of the applicant show that a unique, radially extending blade 5314 prevents weeds from tangling around the tool, Advantageously, the blade is arranged to extend over few centimeters from the center of the rotational axis, in particular in a range from 1 to 7 cm.

The distal extremity 521 of the articulated arm further supports at least some operational parts of the first spraying tool 532.

In the illustrated embodiment, a tank 5324 of product to apply is mounted on the proximal extremity of the articulated arm 52, for example under the solar panels of the robot vehicle. The first spraying tool further comprises a spraying nozzle 5321 and a spraying pump 5322 of the first spraying tool 532 are both mounted on the distal extremity 521 of the articulated arm 52. The proximity of the nozzle 5321 and the pump 5322 permits a more accurate control of the dispersion, by reducing the perturbations due to the movements and torsions of the tube 5323 connecting the tank 5324.

In another embodiment (not shown), the pump is mounted on the proximal extremity of the articulated arm 52, thus reducing the mass on this mobile extremity. This increases the speed of displacement of the distal extremity of the articulated arm. Another advantage is that the load affecting the mobile part is independent of the amount of fluid in the tanks 5324, 5334. This permits not only a more accurate driving of the robot vehicle, but also more accurate estimations of the energy consumption and of the remaining robot autonomy.

The distal extremity of the articulated arm 52 may further support at least parts of the second spraying tool 533, such as the spraying nozzle 5331 of the second spraying tool 533. The spraying pump 5332 and the tank 5334 of the product of the second spraying tool 533 may be mounted on a proximal portion 522 of the articulated arm, i.e., on a portion fixed relative to the infrastructure of the robot. The pump is connected to the spraying nozzle 5331 by a tube 5333.

The fluid product applied by the second spraying tool 533 may be a non-specific herbicide acting on both the first and on the second vegetable organisms (e.g. a broad effect product).

Figure 3:
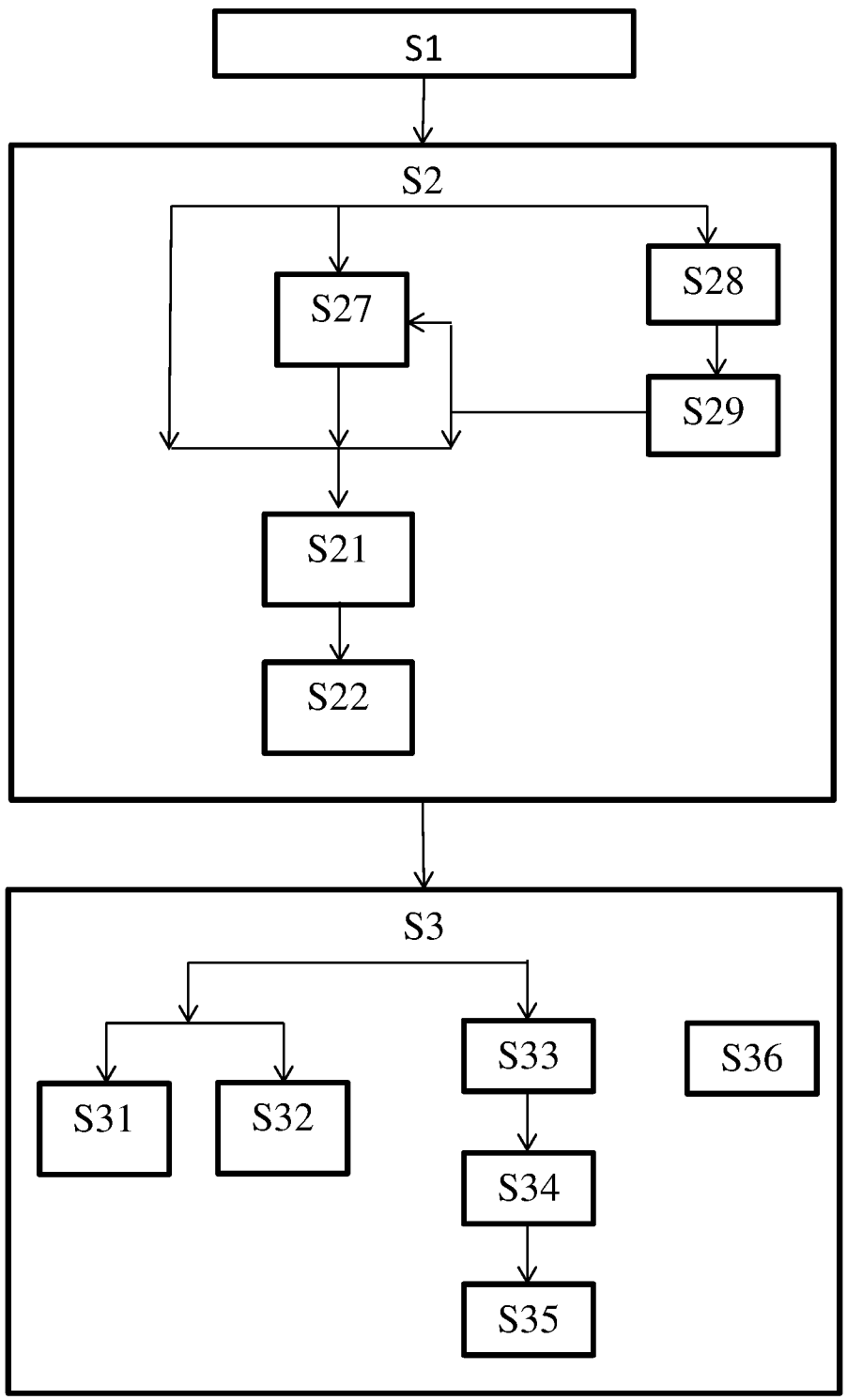
FIG. 3 illustrates a flow diagram of a method for automatically selecting a tool from a group of tools, according to the invention.
Figure 4:
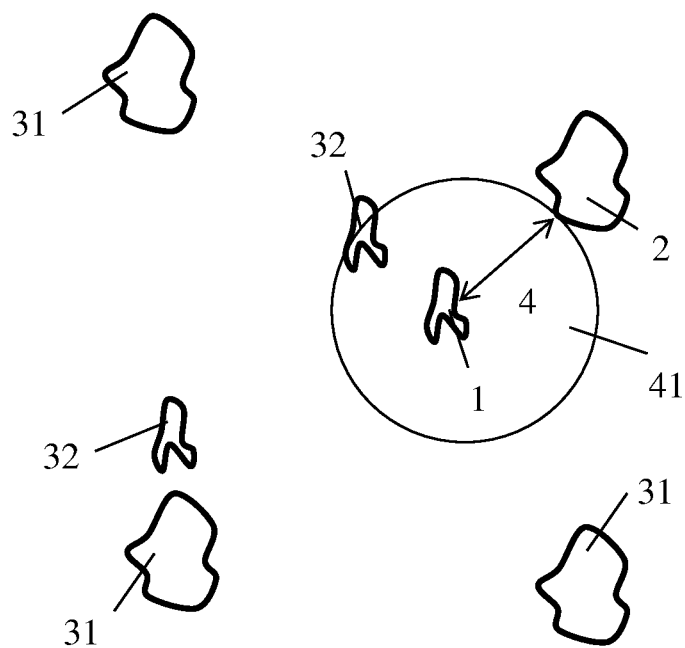
FIGS. 4 and 5 illustrate some examples of spatially arrangements of vegetable organisms within a cultivated field.
Figure 5:
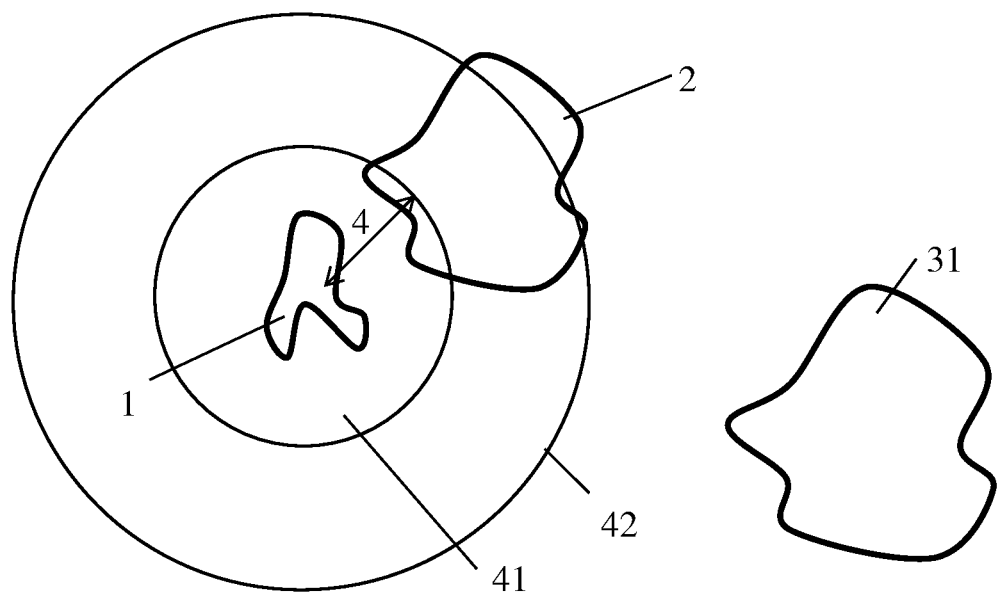

FIG. 3 illustrates an embodiment of the method used by the robot vehicle for treating the vegetable organisms, while FIGS. 4 and 5 give some example of a spatially disposal of vegetable organisms comprising cultivated plants 2, 31 and weeds 1,32 within a cultivated field.

The method comprises steps of capturing images of the ground with a camera 51 on the robot 5 (step S1); determining with those images the distance 4 between a first vegetable organism 1 in the image and a second vegetable organism 2 (step S2); and selecting a treatment tool 53 for a treatment of the first vegetable organism 1 from a group 54 of treatment tools as function of the distance 4 (Step S3).

The image captured with the camera 51 can be a combination of one or several images taken each at one or several wavelength bands, such as RGB, infra-red or hyperspectral images. The image captured with the camera 51 can be further a combination of 3D images (e.g. depth maps) provided, for example, by a stereo camera or a time of flight camera.

The acquired images can be raw images provided directly by a camera sensor or an image further processed by an acquisition system.

The distance 4 may be measured between a portion of the first vegetable organism 1 and a portion of the second vegetable organism 2.

The step S2 of determining the distance 4 can comprise:
a step of determining a position of a portion of the first vegetable organism 1 within the images (step S21); and
a step of determining a position of a portion of the second vegetable organism 2 within the images (step S22).

In one embodiment, the distance 4 is a distance between a portion of a foliage 11 of the first vegetable organism 1 and a portion of a foliage 21 of the second vegetable organism 2. In a variant, the distance 4 is an edge-to-edge distance between the foliage 11 of the first vegetable organism 1 and the foliage 21 of the second vegetable organism 2. In another variant, the distance 4 is a centre-to-centre distance between a foliage 11 of the first vegetable organism 1 and a foliage 21 of the second vegetable organism 2. The centre of the foliage can be the centre of gravity of the image of the foliage.

The step S2 of determining the distance 4 can comprise a step of determining the closest vegetable organism of a group of vegetable organisms with respect to the first vegetable organism (Step S27). For example, if the first vegetable is a weed, step S27 may imply a determination of the closest cultivated plant in order to select the most suitable weed elimination tool.

The step S2 of determining the distance 4 can thus comprise a step of determining the variety of each vegetable organism on the images, in particular determining the vegetable organisms being a weed or, alternatively or complementarily, determining the vegetable organisms being a cultivated plant. Alternatively, the robot may classify each vegetable organisms within at least of two classes (Step S28), e.g. a class of cultivated vegetable organisms 31 and a class of weeds 32.

The classifier may be a software module. It may be based on neural network for example.

During step S3, the processing system of the robot selects the treatment tool 53 which is the most cost-effective or/and more efficient for treating the first vegetable. In the case of a weed, it selects a tool efficient at removing this first vegetable while leaving cultivated plants substantially unharmed and untreated. The selection comprises a comparison of the distance with a predefined threshold 42 (Step S31). The most cost-effective and/or environmental friendly treatment tool 53 at disposal is selected each time the use of this tool permits to leave the surrounding wanted vegetable organisms unharmed.

In a preferred embodiment, the threshold 42 is determined as a function of an operational range of the treatment tool.

A first treatment tool is selected when the distance is higher than the threshold 42. A second treatment tool is selected when the distance is lower than the threshold 42 (Step S32).

A plurality of predefined thresholds may be predefined and determine the selection between more than two treatment tools.

The thresholds may be predetermined or depend on the treatment tools which are mounted onto the robot. The method may include a step of collecting operational ranges of the tools, and modifying the threshold.

It is also possible to modify the operational range of a tool depending on the distance between the first and second vegetable organisms (step S36). For example, in the case of a spraying tool, it is possible to vary the vertical distance between the nozzle of the spraying tool and the vegetable organism 1 to be treated, or to control the pressure or the angle of the spraying cone.

In one embodiment, the camera 51 is a 3D camera with which the profile of the ground and the height of the plant can be determined. This profile can be used for determining the optimal height of the spraying tool above the ground and the plant, and to control the depth of penetration of the mechanical tool.

The selection of a suitable treatment tool may further depend on physical parameters measured by sensors on the robot and/or received from a remote computational device 9.

The sensors on the robot or connected to the remote computational device 9 can measure environmental parameters capable such as, without limitation, temperature, moisture rate, air humidity, sun illumination, ground structure, ground humidity and air humidity.

The remote computational device 9 can receive and transmit to the processing system of the robot parameters from external information providers 92 such as local and/or regional meteorological information, including wind speed, temperature, atmospheric pressure and weather forecast. Other providers 93 can provide local and/or regional agriculture advices and information, e.g. recommended doses of products, recommendation on an application of treatment products on some culture, temporary prohibition to apply treatment products as well as Moon's phases and ephemeris, in particular sunrise and sunset times.

Those parameters can be transmitted to the processing system of the robot and used in the determination of the most suitable treatment tool for each vegetable organism.

It is for example known that some phytosanitary products are only efficient within a limited temperature range. This information may be used for preventing use of this product if the temperature is not within the range, or if the weather forecast indicates that the temperature will be outside the range soon.

Use of a spraying tool may also be avoided during a rain, if the humidity is not within a predetermined range, or before a rain.

The amount of product sprayed may also be adapted to the environmental parameters and/or to the size of each first vegetable organism to treat. For example, a higher amount of products may be used for treating a large vegetable organism, and/or an organism far from organisms of a different type, and/or for compensating the evaporation if the temperature is high, or will be high.

A selection between different products to be sprayed may depend on the type of vegetables recognized, on the above mentioned distance, and on environmental parameters.

The remote computational device 9 may communicate with the robot vehicle 5 via a bidirectional wireless link in order to provide those parameters to the robot vehicle, and to receive from the robot vehicle operational information relative to the treatment executed by the robot vehicle. The operational parameters may include for example a status of the robot or robot equipment, robot vehicle position, already executed and/or planned operations, tools status, tank product levels, quantities of products applied, energy level of the power supply, energy production of the solar panel, estimated reduction of dispersion of chemical products. The remote computational device 9 can further request the robot vehicle 5 to provide information through the wireless link about the culture and the vegetable organisms within the cultivated area, including for example and without limitation number and/or position of weeds, number and/or positioning of cultivated organisms, vegetable organisms growth, number and positioning of obstacles detected within the acquired images, information on unsuccessfully removed weeds, etc. The information can comprises images of culture portions that are acquired by the camera 51 and eventually processed by the computer vision system 56.

The remote computational device 9 can also be used for remotely controlling the robot vehicle 5.

The selection of a suitable treatment tool may further depend on the relative positioning of the robot vehicle with respect to the first vegetable organism 1 and/or on the speed of the robot vehicle.

The selection of a suitable treatment tool may further depend on the estimated number of vegetable organisms to be treated in a predefined time period. In case of an important number of vegetable organisms to be processed that could temporarily slow down the treatments of dense culture fields, various scenarios for temporarily maintaining or speeding up the treatment speed/rate of the robot vehicle could be thus conceivable, e.g.:

- when the distance between a weed and the nearest cultivated plant is higher than the minimal threshold for using the physical tool and the minimal threshold for using a non-selective herbicide, the spraying tool applying the non-selective herbicide can be selected and used instead of the mechanical tool;
- when the distance between a weed and the nearest cultivated plant is higher than the minimal threshold for using the physical tool and less than the minimal threshold for using a non-selective herbicide, the spraying tool applying the selective herbicide can be selected and used instead of the mechanical tool.

In case the size of the weed requires more distinct physical treatments applied by the physical tool, either the spraying tool applying the selective herbicide or the spraying tool applying the non-selective herbicide can be selected (depending on the distance between the weed and the nearest cultivated plant) for temporarily maintaining or speeding up the treatment speed/rate of the robot vehicle.

The selection of a suitable treatment tool may further depend on the available electrical energy of the robot vehicle. For example, when the residual electrical power of the robot goes down to a predefined threshold, the less power consuming tool between a sub-group of suitable tools can be selected to eliminate or kill the weed, e.g.:

- when the distance between the weed and the nearest cultivated plant is higher than both the minimal thresholds for using the physical tool and for using a non-selective herbicide, the less electrical power consuming tool between the physical tool and the spraying tool applying the non-selective herbicide can be selected and used for eliminating or killing the weed;
- when the distance between the weed and the nearest cultivated plant is higher than the minimal threshold for using the physical tool but less than the minimal threshold for using a non-selective threshold, the less electrical power consuming tool between the physical tool and the spraying tool applying the selective herbicide can be selected and used for eliminating or killing the first vegetable organism.

Advantageously, the robot vehicle is arranged to compute the shortest distance between the vegetable organisms to be treated in order to maximize the number of operations of the articulated arm within a period of time. The displacement speed of the robot vehicle can be adapted in order to optimize the performing of the treatments. For instance, when the number of vegetation plants to be processed is high, the robot may slow down in order to give more time to the articulated arms to perform the individual operations. The displacement speed of the robot vehicle can be adapted in order to reduce the electrical consumption of the robot vehicle, e.g. in case of unfavourable illumination conditions. Moreover, in case of a high density of vegetable organisms to treat or in case of low available energy, a treatment tool allowing a faster treatment and/or permitting to reduce electrical consumptions can be selected. In case of a difficult to efficacy reach a vegetable organism by a treatment tool (in particular by the physical or mechanical tool), a treatment tool permitting to efficiently reach the vegetable organism can be selected.

Figure 6:
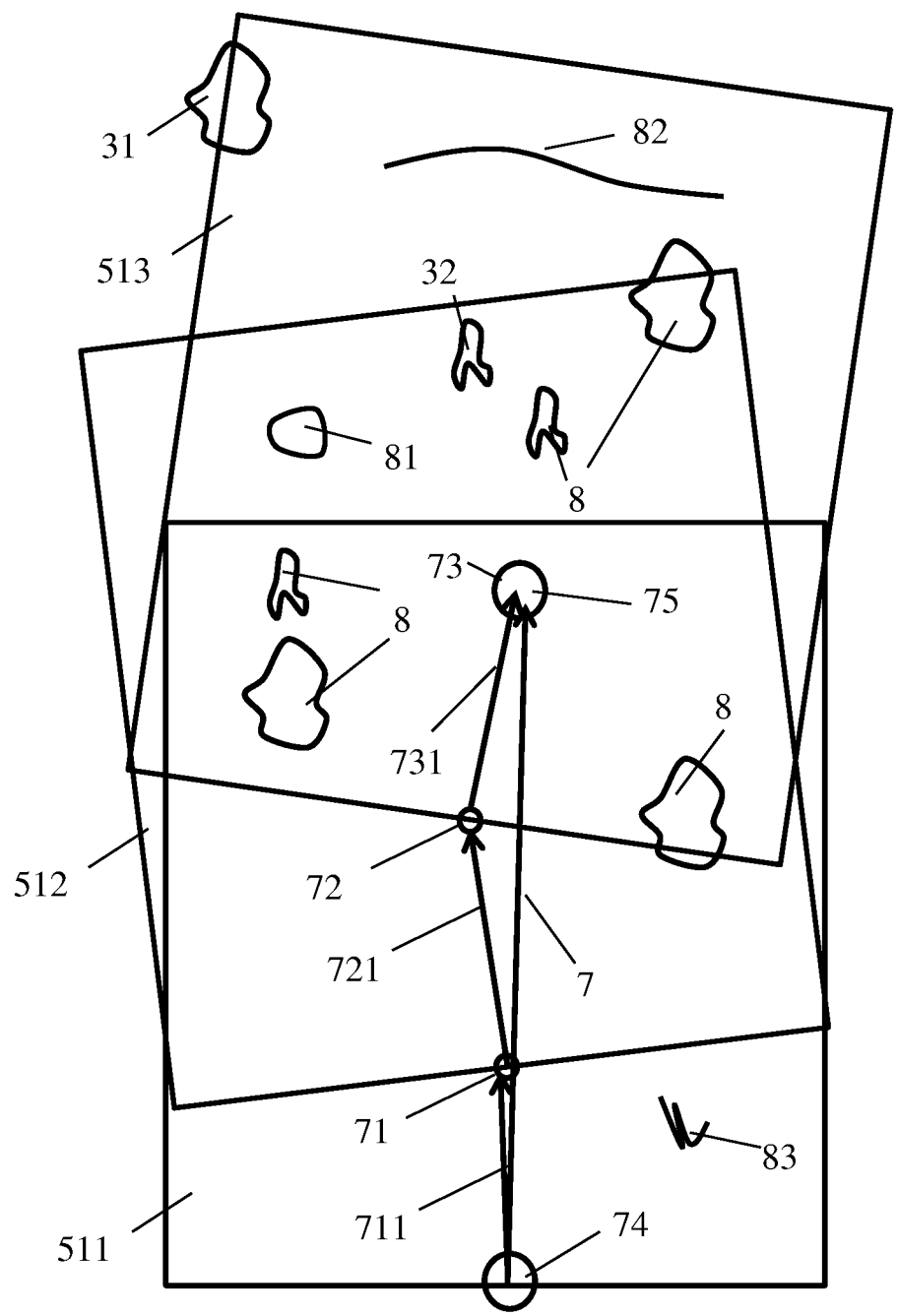
FIG. 6 illustrates a series of acquired images permitting a correction of a navigation path.

FIG. 6 schematically illustrates a navigation method of a robot vehicle for a treatment of a vegetable organism. This method as described hereafter can be used with the robot vehicle and method as previously described, or with a different robot vehicle or method.

The navigation along a desired navigation path 7 is based on successive determinations of the positions of the vehicle. Reference 71 illustrates a first position 71 of the vehicle, reference 72 a successive second position 73 and reference 73 a successive third position 73 on the surface of the ground.

Rough estimates of the position of the vehicle are determined with a satellite navigational system, such as a GPS, Glonass or Galileo system. This satellite based navigational system is used for an absolute positioning of the robot, and for controlling its desired trajectory as defined in advance by the operator of the robot for example. In one embodiment, the operator defines with the remote computational device 9 the size, shape and position of the cultivated field, as well as the distance between rows, and the processing system of the robot vehicle determines in advance the approximate optimal trajectory.

A finer determination of the displacements of the robot vehicle is then computed by the processing system, using the computer vision to analyze the series of frames 511, 512, 513 captured by the camera 51 or by an additional, dedicated camera. This computer vision system compares the position of reference features 8 in successive images captured at successive time intervals $T_i$, $T_{i+1}$, $T_{i+2}$, in order to determine the displacement 711, 721, 731 of the robot vehicle between those frames. Various features can be tracked in successive images 511, 512, 513, for example vegetables organisms, edges of leaves, straws as well as inorganic organism and soil features as ground cracks, stones etc.

Additionally, an inertial system, such as an accelerometer or a gyroscope, can be used for detecting the displacements of the robot vehicle and correcting the position determined by the satellite position system and by the computer vision system.

This finer estimation of the displacements of the robot vehicle can be used to correct or precise the position determined by the satellite positioning system. It can also be used for aligning the displacements of the robot vehicle with rows of cultivated plants, for example in order to define a trajectory 71 of the robot vehicle which is centered above the rows and minimize the displacements of the treatment tools.

The images captured by the camera 51 can comprise a portion of the ground in front of the robot vehicle. Vegetable organisms in this portion are only accessible by the robot on the vehicle at a later stage, after a displacement of the robot vehicle toward this portion. The direction and amplitude of this displacement is determined by the computer vision system and, optionally, by the inertial sensor.

NUMBERED ITEMS

1 First vegetable organism
11 A foliage of the first vegetable organism
12 A root of the first vegetable organism
13 A trunk of the first vegetable organism
2 Second vegetable organism
21 A foliage of the second vegetable organism
22 a root of the second vegetable organism
23 A trunk of the second vegetable organism
3 Vegetable organism
31 Cultivated plant
32 Weed
4 Distance between the first and second vegetable organisms
41 Operational area around the first vegetable organisms
42 Threshold
5 Robot vehicle
51 Camera 511-3 Images
52 Articulated arm
521 Distal extremity
522 Proximal extremity
53 Treatment tool
531 Physical treatment tool
5311 Rod
5312 Rotational axis
5313 Terminal portion
5314 Blade
532 first spraying treatment tool
5321 Nozzle
5322 Pump
5323 Tube
533 second spraying treatment tool
5331 Nozzle
5332 Pump
5333 Tube
54 Group of treatment tools
55 Global navigation satellite system
56 Computer vision system
57 Wireless communication unit
58 Solar panel
59 Electrical power supply
500 Driving motor
6 Ground
61 Surface of the ground
7 Defined Navigation path
71 Real Navigation path between time $T_i$ and $T_{i+1}$
711 Position of the robot at time $T_{i+1}$
72 Real Navigation path between time $T_{i+1}$ and $T_{i+2}$
721 Position of the robot at time $T_{i+2}$
73 Real Navigation path between time $T_{i+2}$ and $T_{i+3}$
731 Position of the robot at time $T_{i+3}$
74 Start position
75 Destination position
8 Visual feature
81 Stone
82 Ground crack
83 Straws
9 Remote computational device
91 Sensor
92 Weather station
$T_i$ Time interval $T_i$
$T_{i+1}$ Time interval $T_{i+1}$
$T_{i+2}$ Time interval $T_{i+2}$
S1 Step of capturing at least an image of the first vegetable organism
S2 Step of determining a distance between the first vegetable organism and a second vegetable organism
S3 Step of selecting a treatment tool
S21 Step of determining the position of a portion of the first vegetable organism
S22 Step of determining the position of a portion of the second vegetable organism
S27 Step of determine the closest vegetable organism of a group of vegetable organisms with respect to the first vegetable organism
S28 Step of determine a variety of the first vegetable organism
S29 Step of determine a variety of the vegetable organisms near the first vegetable organism
S31 Step of selection of a first predefined treatment tool or a selection of a tool comprised in a first subgroup of tools
S32 Step of selection of a second predefined treatment tool or a selection of a tool comprised in a second subgroup of tools
S33 Step of collecting indications of operational ranges of the treatment tools
S34 Step of determining a subgroup of treatment tools of the group 54 of treatment tools;
S35 Step of selecting a treatment tool from the subgroup of treatment tools
S36 Step of determining a relative positioning of the selected treatment tool with respect to the first vegetal organism

The invention claimed is:

1. A method using a robot for an automatic treatment of weeds, the method comprises steps of:
   capturing images of a weed with a camera on said robot;
   determining with said images a distance between said weed and a cultivated plant through direct measurement; and
   selecting a treatment tool from a group of treatment tools of said robot for a treatment of the weed as a function of said distance, wherein the group of treatment tools comprises a physical tool and a spraying tool
   wherein the group of treatment tools comprises a subgroup comprising physical tools and a sub-group comprising spraying tools, and wherein a least electric power consuming tool is selected in either sub-groups.

2. The method of the claim 1, wherein said distance being the distance between said weed and a cultivated plant which is the closest to said weed among a group of cultivated plants.

3. The method of claim 1, wherein said step of selecting comprises selecting said spraying tool for applying a selective herbicide when said distance is shorter than a threshold.

4. The method of claim 1, wherein said step of selecting comprises selecting said physical tool when said distance is longer than a threshold.

5. The method of claim 1, wherein the group of treatment tools further comprises a second spraying tool suitable for applying a non-selective herbicide, wherein said step of selecting comprises selecting the second spraying tool and/or the physical tool when said distance is longer that a threshold.

6. The method of claim 1, wherein the physical tool is a mechanical cutting or uprooting tool, an optical tool emitting electromagnetically radiations, an electrical tool emitting electric discharge or a heat radiant tool.

7. The method of claim 6, wherein said mechanical tool comprises a rod arranged to rotate about its longitudinal axis and having a terminal portion arranged to penetrate a surface of a ground and wherein a single longitudinal straight blade is connected to the rod and extends substantially orthogonally outward from the rod.

8. The method of claim 1, wherein the step of selecting the treatment tool from the group of treatment tools of said robot further depends on the estimated number of weeds to be treated in a predefined time period.

9. The method of claim 1, wherein the robot is electrically powered, and wherein the step of selecting the treatment tool from the group of treatment tools of said robot further depends on the available electrical energy of the robot vehicle.

10. A robotic vehicle for carrying out the method of the claim 1, comprising:
    an image acquisition device for capturing images;
    a computer vision system arranged for determining from said images a distance between a weed and a cultivated plant through direct measurement;
    a selecting system arranged for selecting a treatment tool from a group of treatment tools for a treatment of the weed as a function of said distance, wherein the group of treatment tools comprise a physical tool and a spraying tool; and a tool supporting system arranged to support the treatment tools and arranged to move at least operational extremities of said treatment tools with respect to the robot vehicle.

11. The robotic vehicle of claim 10, wherein said tools supporting system comprises at least one articulated arm supporting at least some of said treatment tools.

12. The robotic vehicle of claim 10, wherein said tools comprises a first spraying tool for applying a selective herbicide, and a second spraying tool for applying a non-selective herbicide.

13. The robotic vehicle of claim 12, wherein said tools comprises at least one spraying tool, said spraying tool comprising a pump and a nozzle supported on a distal extremity of an articulated arm.

14. An arrangement for an automatic treatment of a weed, comprising a remote computational device and the robot vehicle of claim 10; wherein said robot vehicle is further arranged to send data to said remote computational device through a wireless link, wherein said data comprises a reporting message and/or an acquired image.

15. The method of claim 1, wherein the least electric power consuming tool between the physical tool and the spaying tool applying a non-selective herbicide may be selected and used for eliminating or killing the weed when the distance between the weed and the nearest cultivated plant is higher than both the minimal thresholds for using the physical tool and for using the spraying tool.

16. The method of claim 1, wherein the least electrical power consuming tool between the physical tool and the spraying tool applying a selective herbicide can be selected and used for eliminating or killing the first vegetable organism when the distance between the weed and the nearest cultivated plant is higher than the minimal threshold for using the physical tool but less than the minimal threshold for using a non-selective herbicide.

17. The robotic vehicle of claim 11, wherein a distal extremity of said at least one articulated arm supports a mechanical tool comprising a rod equipped with a blade to eliminate a weed, the robotic vehicle being arranged to move the distal extremity of the articulated arm so that the horizontal relative speed of the rod with respect to the ground is substantially zero during the elimination of the weed.

18. The robotic vehicle of claim 11, wherein said at least one articulated arm comprises a rotatable physical tool.

19. The robotic vehicle of claim 11, comprising a platform, a camera mounted at a forward position on the platform and said at least one articulated arm mounted rearward of the camera.

20. A method using a robot for an automatic treatment of weeds, the method comprises steps of:

capturing images of a weed with a camera on said robot;

determining with said images a distance between said weed and a cultivated plant through direct measurement; and selecting a treatment tool from a group of treatment tools of said robot for a treatment of the weed as a function of said distance, wherein the group of treatment tools comprises a physical tool and a spraying tool wherein the physical tool is a mechanical cutting or uprooting tool, an optical tool emitting electromagnetically radiations, an electrical tool emitting electric discharge or a heat radiant tool, and wherein said mechanical tool comprises a rod arranged to rotate about its longitudinal axis and having a terminal portion arranged to penetrate a surface of a ground and wherein a single longitudinal straight blade is connected to the rod and extends substantially orthogonally outward from the rod.

* * * * *